(No Model.)
M. S. GIFFORD.
LAWN RAKE.
No. 530,041. Patented Nov. 27, 1894.
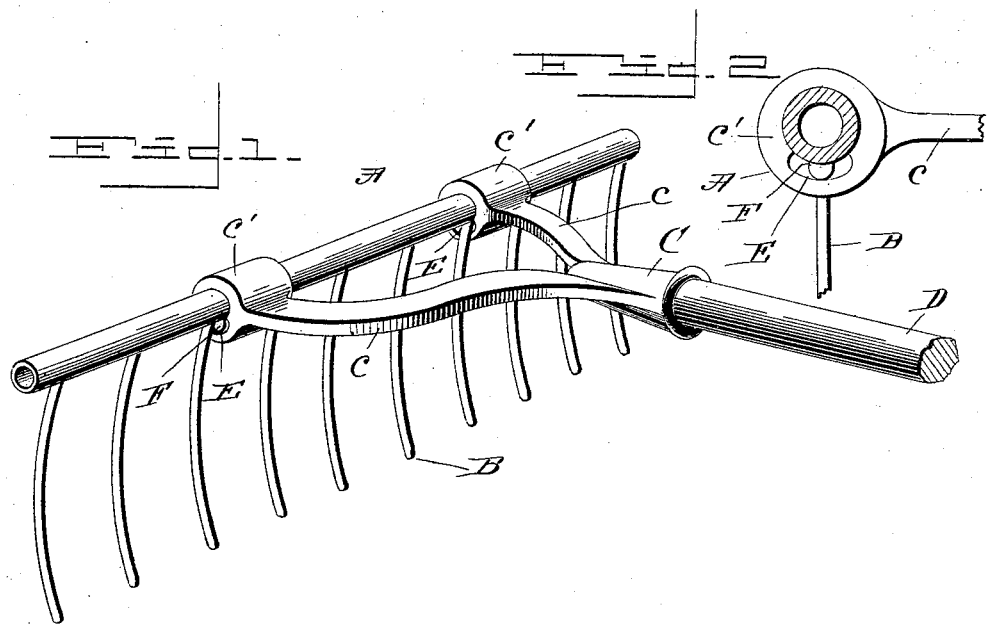

UNITED STATES PATENT OFFICE.

MARTIN S. GIFFORD, OF LOCKPORT, NEW YORK.

LAWN-RAKE.

SPECIFICATION forming part of Letters Patent No. 530,041, dated November 27, 1894.

Application filed January 18, 1894. Serial No. 497,232. (No model.)

*To all whom it may concern:*

Be it known that I, MARTIN S. GIFFORD, a citizen of the United States of America, residing at Lockport, in the county of Niagara and State of New York, have invented certain new and useful Improvements in Lawn-Rakes, of which the following is a specification, reference being had therein to the accompanying drawings.

This invention in general relates to rakes and is more particularly designed to be employed in connection with lawn-rakes.

This invention has for its object to employ novel means whereby the head will be movable; furthermore, that when the rake is being used in the ordinary and well known manner the teeth will attain an upright position, but when the rake is operated in the opposite direction the teeth will assume a position slanting toward the handle thereby rendering the head self cleaning.

A further object of the invention is to construct a rake of the above referred to class that will have advantages in points of strength, durability and general efficiency.

With the above and other objects in view, the invention consists in the novel construction, combination and arrangement of parts to be hereinafter more particularly described and specifically pointed out in the claim.

Referring to the accompanying drawings, forming a part of this specification and wherein like letters of reference indicate similar parts throughout both views:—Figure 1, is a view in perspective of a lawn rake with my improvement attached thereto. Fig. 2, is a detail view of the sleeve or collar and movable head.

In the drawings A, represents a head made preferably of tubular metal, the teeth B, which may be of any desired form and inserted in the well known manner.

C, represents the handle socket, adapted to receive the end of the handle D. The handle socket C, has outwardly extending arms c, c, carrying the collars or sleeves c', c', having formed interiorly a semi-circular recess E, adapted to receive the tubular head provided with a lug F. The latter operates in the semi-circular recess E, which allows the head to rock back and forth, to an angle of approximately forty-five degrees from its normal position.

Operation:—When the rake is operated in the forward direction the teeth will assume an upright position, the lug limiting the rotation of the head. When the reverse or back movement of the handle takes place, the rake-head will partially rotate to allow the back part of the teeth to engage the stubble by which the grass or leaves may be readily removed from the teeth and not drag back with the rake. At the end of the reverse movement the handle may be again drawn toward the operator and the teeth assume their normal position. The collar or sleeve is placed on the head between a set of teeth, thus preventing a lateral motion that would otherwise take place.

Having fully described my invention, what I claim as new, and desire to secure by Letters Patent, is—

In a lawn rake, the combination with a handle having diverging arms terminating in sockets, semi-circular recesses formed in the bottom of the sockets, a cylindrical rake head carrying teeth, lugs under the head between the teeth adapted to fit into the recesses of the sockets, substantially as and for the purpose specified.

In testimony whereof I affix my signature in presence of two witnesses.

MARTIN S. GIFFORD.

Witnesses:
J. W. FESSENDEN,
JOHN KLOPF.